(12) United States Patent
Chang

(10) Patent No.: US 7,400,936 B2
(45) Date of Patent: Jul. 15, 2008

(54) MECHANISM FOR RAPIDLY INSTALLING AND DETACHING HARD DISK

(75) Inventor: Lin Wei Chang, Taipei (TW)

(73) Assignee: Inventec Corporation, Taipei (TW)

( * ) Notice: Subject to any disclaimer, the term of this patent is extended or adjusted under 35 U.S.C. 154(b) by 1170 days.

(21) Appl. No.: 10/638,397

(22) Filed: Aug. 12, 2003

(65) Prior Publication Data

US 2005/0038926 A1 Feb. 17, 2005

(51) Int. Cl.
*G06F 17/00* (2006.01)
(52) U.S. Cl. .......................... 700/90; 361/685; 361/727
(58) Field of Classification Search .................. 700/90; 361/685, 727
See application file for complete search history.

(56) References Cited

U.S. PATENT DOCUMENTS 5,481,431 A * 1/1996 Siahpolo et al. ............. 361/685
5,641,296 A * 6/1997 Larabell et al. ............. 439/342
5,924,782 A * 7/1999 Park ........................... 312/328
5,947,572 A * 9/1999 Chang ...................... 312/332.1
6,515,855 B1 * 2/2003 Removedummy ........... 361/685
6,556,432 B2 * 4/2003 Chen et al. .................. 361/685
6,625,014 B1 * 9/2003 Tucker et al. ............... 361/685

\* cited by examiner

*Primary Examiner*—Alexander J Kosowski
(74) *Attorney, Agent, or Firm*—Bacon & Thomas, PLLC

(57) ABSTRACT

The present invention is to provide a mechanism for rapidly installing and detaching a hard disk, comprising a U-shaped handle pivotally mounted at both sides of the hard disk and having a latch in a forward side, and a frame for receiving the hard disk having an elastic member in a forward end and a projection on a side of the elastic member for engaging with the latch while the handle being pivoted down into a gap between the hard disk and the frame, enabling the sides of the hard disk to urge against the frame and the handle and be firmly installed in the frame. While detaching the hard disk from the frame, it only needs to push the projection outward until being disengaged from the latch and then pull the handle upward to remove the hard disk from the frame.

3 Claims, 4 Drawing Sheets

MECHANISM FOR RAPIDLY INSTALLING AND DETACHING HARD DISK

FIELD OF THE INVENTION

The present invention relates to hard disk fastening mechanisms and more particularly to an improved mechanism mounted in a hard disk frame capable of rapidly installing the hard disk in a computer and detaching the hard disk from the computer.

BACKGROUND OF THE INVENTION

Conventionally, a plurality of screws are employed to fasten a hard disk in a frame inside a computer case. The hard disk is electrically coupled to a circuit board by means of data and power cables. The operating power of the hard disk is supplied by the circuit board. Also, data can be transferred between the hard disk and the circuit board. However, the disassembly of the hard disk is very tedious when a replacement of the hard disk is required due to malfunctioning or upgrading for a new hard disk of higher capacity. First, a user has to detach the cover of the computer case. Next, detach the hard disk from the frame. Next, install a new hard disk in the frame. Finally, fasten the cover on the computer case. It is understood that downsizing is the trend of modern computers. Thus, the prior art arrangement has difficulty in installing a hard disk in the computer or detaching the hard disk from the computer due to narrow internal space of the computer. Hence, a need for improvement exists.

SUMMARY OF THE INVENTION

A primary object of the present invention is to provide a novel mechanism for rapidly installing and detaching a hard disk. By utilizing the present invention, the above drawback of tedious installation and disassembly of the hard disk experienced by the prior art can be overcome.

One object of the present invention is to provide a mechanism for rapidly installing and detaching a hard disk, comprising a U-shaped handle pivotally mounted at both sides of the hard disk, the handle having a width slightly larger than that of the hard disk, the handle including a latch in a forward side; and a frame for receiving the hard disk, the frame including an elastic member in a forward end, the elastic member including a projection on a side, the projection being adapted to engage with the latch. While installing the hard disk in the frame, the handle is pivoted down into a gap between the hard disk and the frame, enabling the latch of the handle to be engaged with the projection of the frame and the sides of the hard disk to urge against the frame and the handle for fastening the hard disk in the frame. Thus, the hard disk together with the frame can then be inserted into a slot of a computer case. While detaching the hard disk from the frame, it only needs to push the projection outward until the projection is disengaged from the latch and then pull the handle upward to remove the hard disk from the frame. By utilizing the mechanism of the present invention, a user can easily install the hard disk in the computer and detach the same from the computer for repair, maintenance, or upgrading.

The above and other objects, features and advantages of the present invention will become apparent from the following detailed description taken with the accompanying drawings.

DETAILED DESCRIPTION OF THE PREFERRED EMBODIMENTS

Figure 1:
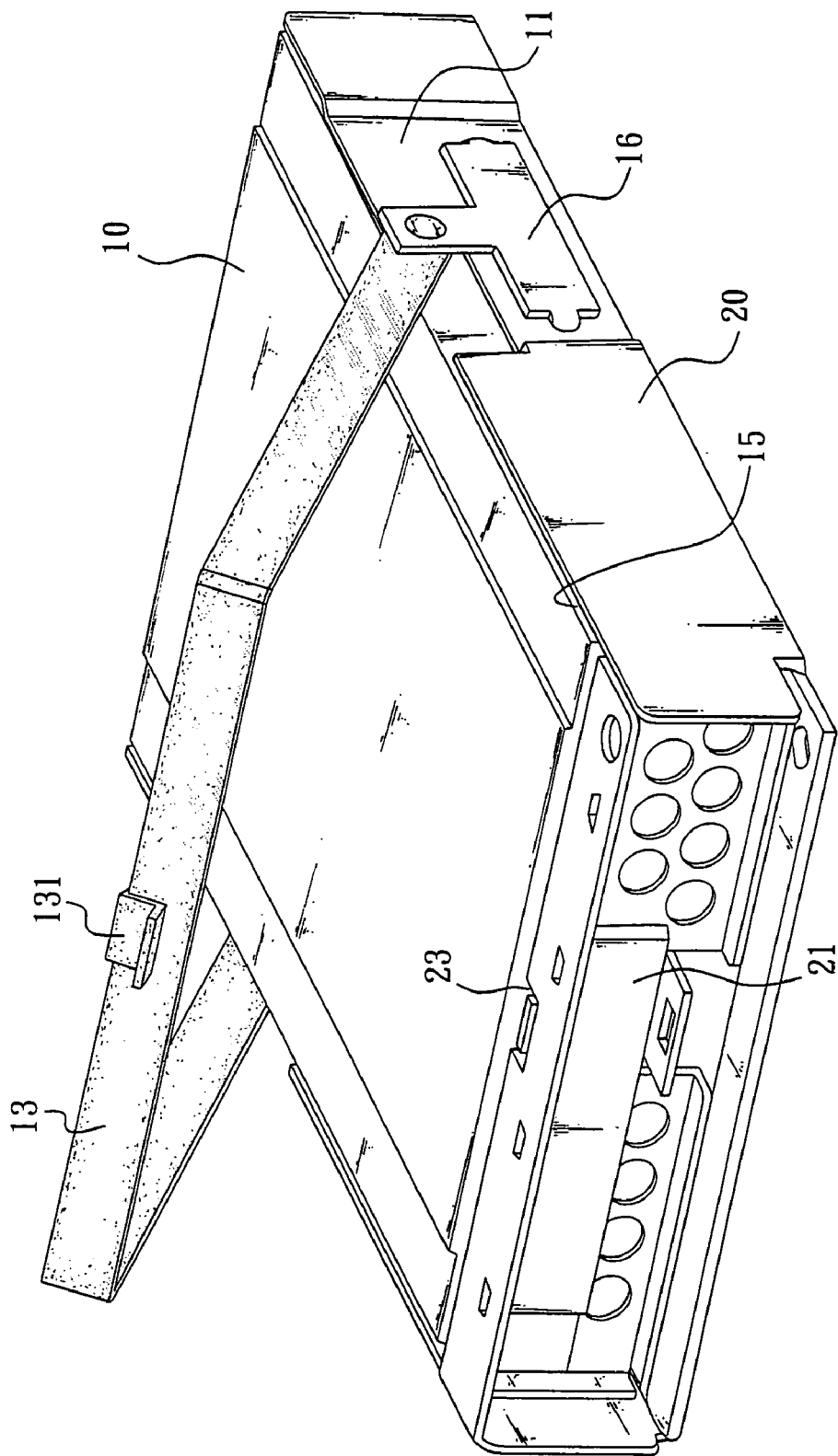
FIG. 1 is a perspective view of a hard disk mounted in a frame incorporating a mechanism according to the invention, where the hard disk is not fastened by the mechanism.
Figure 2:
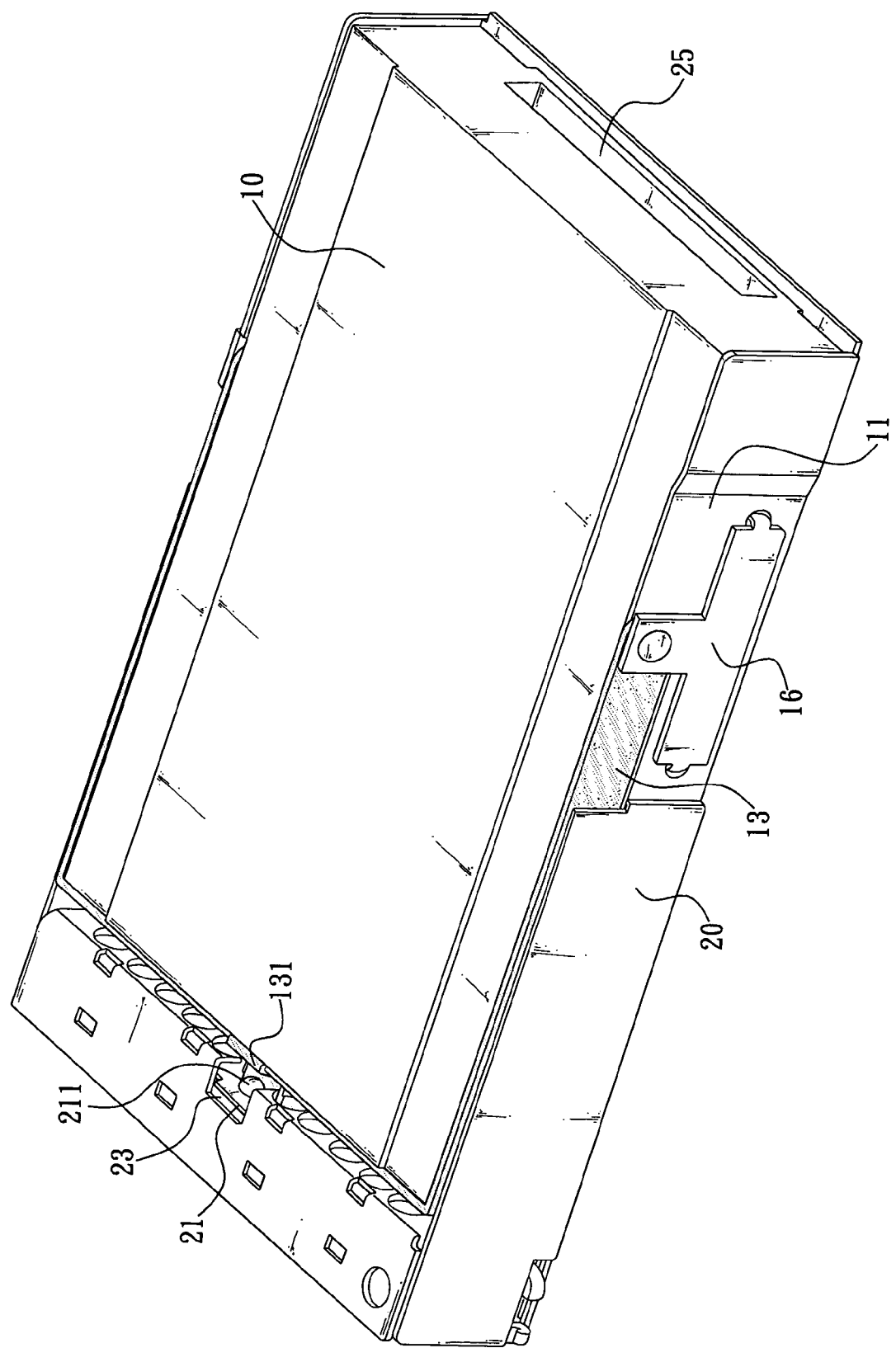
FIG. 2 is a view similar to FIG. 1, where the hard disk is fastened by the mechanism.

Referring to FIGS. 1 and 2, there is shown a mechanism for rapidly installing and detaching a hard disk in accordance with the invention. The mechanism is incorporated in a frame 20 which is adapted to receive a hard disk 10. Note that the frame 20 is also adapted to receive a floppy disk, CD-ROM drive, or the like in other embodiments without departing from the scope and spirit of the invention. A U-shaped handle 13 is pivotally mounted at both sides 11 of the hard disk 10 in which two ends of the handle 13 are pivotal about the sides 11 of the hard disk 10. A width of the handle 13 is slightly larger than that of the hard disk 10 for permitting the handle 13 to pivot about the hard disk 10. The handle 13 comprises a latch 131 in the forward. Correspondingly, an elastic member 21 is formed in a forward end of the frame 20. A rounded projection 211 is formed on a side surface of the elastic member 21. The projection 211 is capable of securing to the latch 131.

Figure 3:
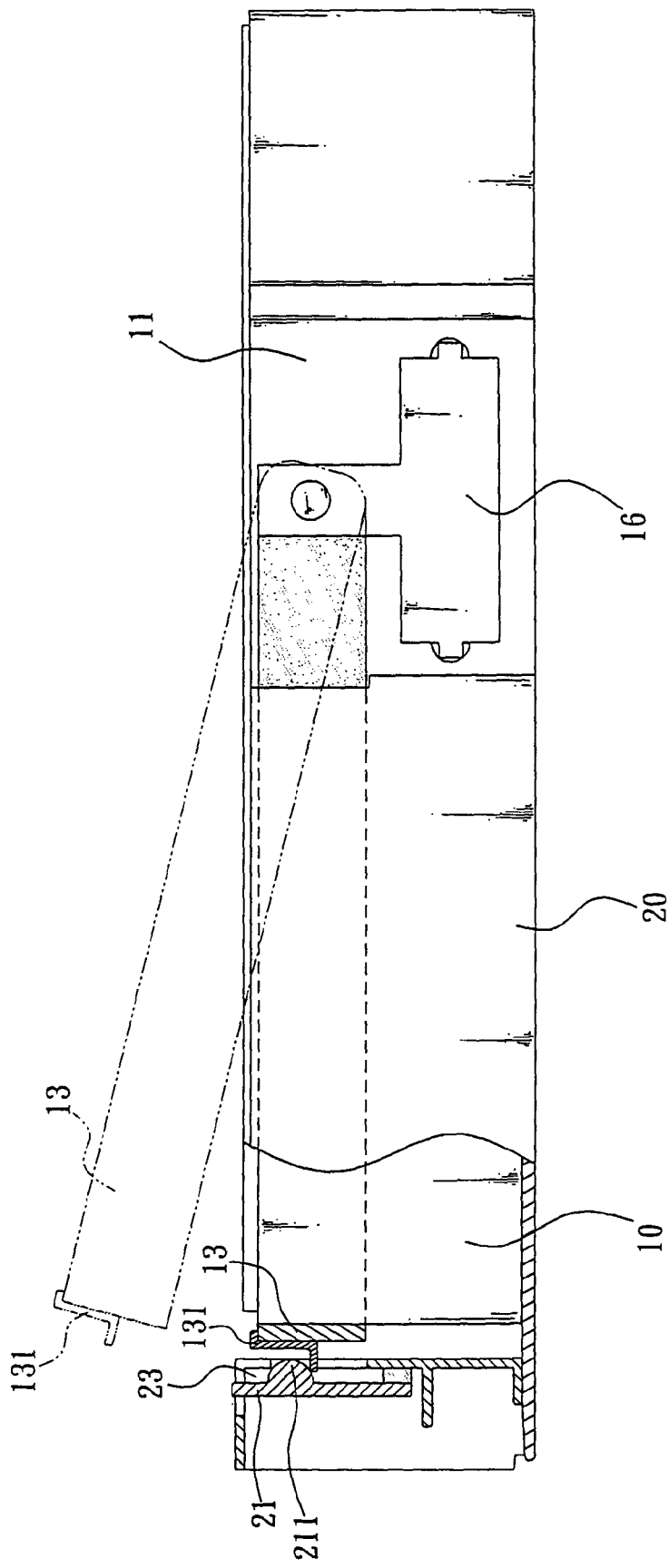
FIG. 3 is a cross-sectional view of the hard disk, the mechanism, and the frame, where the hard disk is fastened by the mechanism.

Referring to FIG. 3 in conjunction with FIGS. 1 and 2, an operation of installing the hard disk 10 in the frame 20 will be described in detail below. First, pivot the handle 13 down and press it into a gap 15 between the hard disk 10 and the frame 20. As such, the latch 131 of the handle 13 is engaged with the projection 211 of the frame 20. Thus, the sides 11 of the hard disk 10 are fastened by the frame 20 and the handle 13. As an end, the hard disk 10 is fastened by the frame 20. Finally, insert the hard disk 10 together with the frame 20 into a slot of a computer case.

Figure 4:
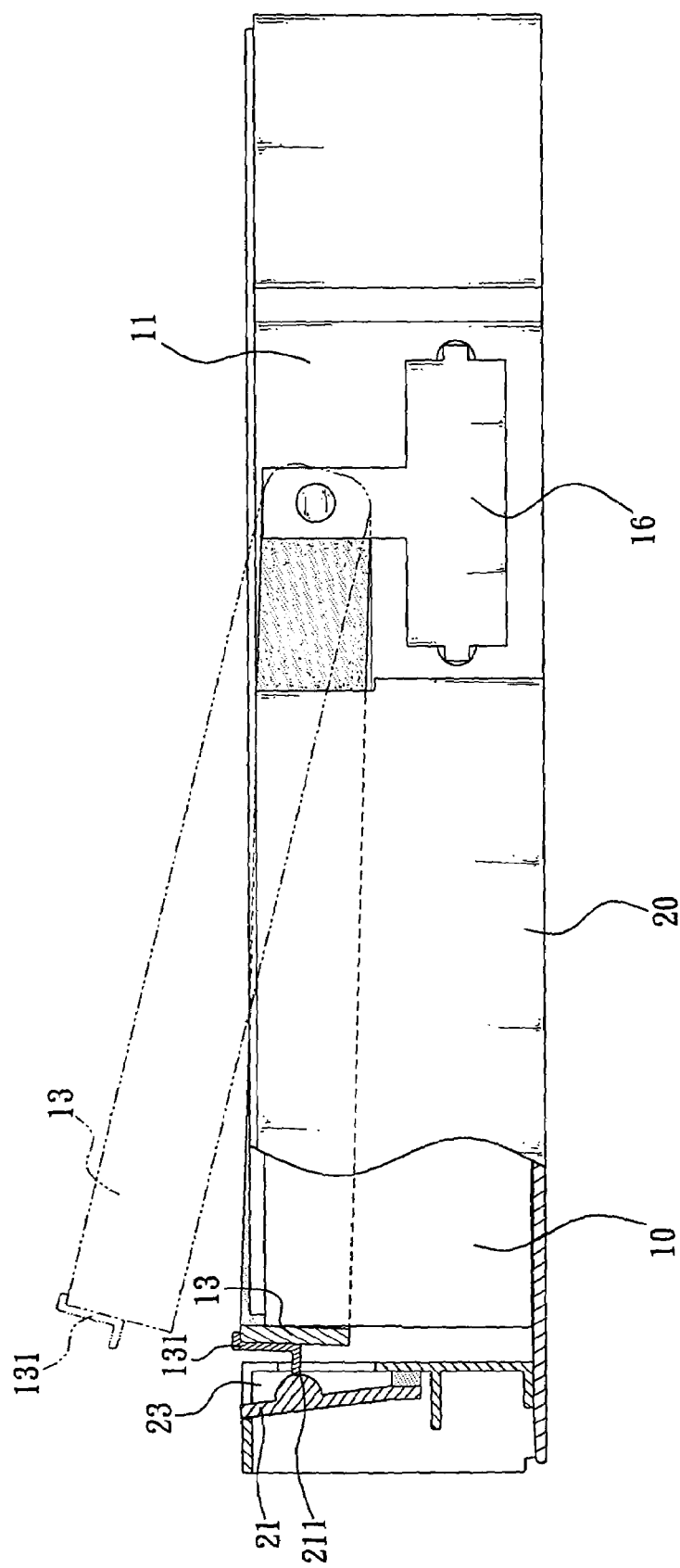
FIG. 4 is a view similar to FIG. 3, the hard disk being shown during fastening.

Referring to FIG. 4 in conjunction with FIG. 1, an operation of detaching the hard disk 10 from the frame 20 will be described in detail below. First, push the projection 211 outward by taking advantage of the elasticity of the elastic member 21 until the projection 211 is disengaged from the latch 131. Next, pull the handle 13 upward for unfastening the hard disk 10 which, as stated above, is urged against to the frame 20 and the handle 13. Finally, remove the hard disk 10 from the frame 20. By utilizing the mechanism of the invention, a user can easily install the hard disk 10 in a computer and detach the same from the computer for repair, maintenance, or upgrading.

Referring to FIGS. 1 and 2 again, in the invention there are further provided two abutment plates 16 coupled to pivot points of the hard disk 10 and the handle 13. Both ends of the handle 13 are pivotally coupled at a gap between the sides 11 of the hard disk 10 and the abutment plates 16. As such, the handle 13 can be protected by the abutment plates 16 when the handle 13 contacts a foreign object.

Referring to FIGS. 1 and 2 again, in the invention there is further provided a groove 23 around the projection 211 of the frame 20. The projection 211 is confined in the groove 23. Also, the latch 131 of the handle 13 is engaged with the projection 211 of the frame 20 in the groove 23.

Referring to FIGS. 1 and 2 again, in the invention there is further provided a connector (not shown) in the rear of the hard disk 10. The connector is electrically coupled to the circuitry of the hard disk 10. Correspondingly, a rectangular opening 25 is formed in the rear of the frame 20. The connector is mounted in the opening 25. In response to inserting the hard disk 10 together with the frame 20 into the slot of the computer case, connecting the connector of the hard disk 10 to a mated connector inside the slot of the computer case. As an end, the circuitry of the hard disk 10 is electrically coupled to the circuitry of the hard disk computer.

Referring to FIGS. 1 and 2 again, in the invention the elastic member 21 is formed of metal having advantages of enhanced elasticity and durability.

While the invention has been described by means of specific embodiments, numerous modifications and variations could be made thereto by those skilled in the art without departing from the scope and spirit of the invention set forth in the claims.

What is claimed is:

1. A mechanism for rapidly installing or detaching a hard disk into or from a frame, comprising:
   a hard disk;
   a U-shaped handle having two ends pivotally mounted at two sides of the hard disk, wherein the width of the handle is larger than the width of the hard disk, and the handle includes a latch disposed at a front side distal to the two ends of the handle; and
   a frame for receiving the hard disk, wherein a gap is formed between the hard disk and the frame for receiving the handle while the hard disk being received in the frame, the frame includes an elastic member formed in the frame adjacent to a front end of the frame, and the elastic member includes a projection formed on a side surface of the elastic member and adapted to engage with the latch;
   whereby, while the hard disk is received in the frame, the handle is pivoted down into the gap between the hard disk and the frame, and the latch of the handle is then engaged with the projection of the elastic member so as to fasten the hard disk in the frame by the handle.

2. The mechanism of claim 1, further comprising two abutment plates coupled to the two sides of the hard disk respectively and each having one end pivotally connected with each of the two ends of the handle, wherein, while the hard disk is received in the frame, the handle is pivoted down into the gap between the hard disk and the frame and the two ends of the handle are pivoted down into the other gaps formed between the sides of the hard disk and the abutment plates.

3. The mechanism of claim 1, further comprising a groove formed on the frame adjacent to the projection of the elastic member, for operating the latch of the handle engaged with the projection of the elastic member while the handle being pivoted down into the gap between the hard disk and the frame.

* * * * *